(12) United States Patent
Grunow et al.

(10) Patent No.: US 8,866,963 B2
(45) Date of Patent: Oct. 21, 2014

(54) TERMINAL HAVING PLURALITY OF OPERATING MODES

(71) Applicant: Hand Held Products, Inc., Fort Mill, SC (US)

(72) Inventors: Jonathan T. Grunow, Indian Trail, NC (US); Jeffrey Baker, Gastonia, NC (US); Matthew Skvoretz, Charlotte, NC (US); Michael Pease, Charlotte, NC (US); Scott Garmon, Wesley Chapel, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/249,497

(22) Filed: Apr. 10, 2014

(65) Prior Publication Data

US 2014/0204268 A1   Jul. 24, 2014

Related U.S. Application Data

(63) Continuation of application No. 12/684,724, filed on Jan. 8, 2010, now Pat. No. 8,698,949.

(51) Int. Cl.
*H04N 5/222* (2006.01)
*H04N 5/225* (2006.01)
*H04N 5/235* (2006.01)
*H04N 5/232* (2006.01)

(52) U.S. Cl.
CPC ......... *H04N 5/2354* (2013.01); *H04N 5/23241* (2013.01); *H04N 5/23245* (2013.01)
USPC .......................................... 348/371; 348/372

(58) Field of Classification Search
USPC .................................................. 348/370–372
See application file for complete search history.

(56) References Cited

U.S. PATENT DOCUMENTS

| | | | |
|---|---|---|---|
| 5,130,737 A | 7/1992 | Azuma et al. | |
| 5,202,720 A | 4/1993 | Fujino et al. | |
| 5,778,264 A | 7/1998 | Kean | |
| 5,825,495 A | 10/1998 | Huber | |
| 5,931,562 A | 8/1999 | Arato | |
| 6,498,901 B2 | 12/2002 | Kawasaki et al. | |
| 6,571,061 B2 | 5/2003 | Kawasaki et al. | |
| 6,870,956 B2 | 3/2005 | Qi et al. | |
| 7,236,697 B2 * | 6/2007 | Kim et al. | 396/157 |
| 7,530,701 B2 | 5/2009 | Chan-Wing | |
| 7,553,051 B2 | 6/2009 | Brass et al. | |
| 7,843,611 B2 | 11/2010 | Albahri | |
| 7,852,300 B2 | 12/2010 | Shteynberg et al. | |
| 7,924,343 B2 * | 4/2011 | Uchida | 348/370 |
| 7,949,249 B2 | 5/2011 | Gai et al. | |
| 8,026,976 B2 * | 9/2011 | Tamura | 348/371 |

(Continued)

*Primary Examiner* — Timothy J Henn

(74) *Attorney, Agent, or Firm* — Additon, Higgins & Pendleton, P.A.

(57) ABSTRACT

There is set forth herein a terminal having an image sensor array and a plurality of operator selectable operating modes. The image sensor array can have an associated light source bank. The operator selectable operating modes can include at least one camera operating mode and at least one flashlight operating mode. In the at least one camera operating mode the image sensor array and light source bank can be controlled for optimization of frame capture. In the at least one flashlight operating mode the image sensor array and the light source bank can be controlled for optimizing illumination of an operators viewing area with reduced average power consumption.

20 Claims, 8 Drawing Sheets

(56) References Cited

U.S. PATENT DOCUMENTS

| | | |
|---|---|---|
| 8,060,136 B2 | 11/2011 | Embler |
| 8,066,402 B2 | 11/2011 | Klipstein |
| 8,291,209 B2 | 10/2012 | Chong et al. |
| 8,698,949 B2 | 4/2014 | Grunow et al. |
| 2002/0196974 A1 | 12/2002 | Qi et al. |
| 2004/0109083 A1* | 6/2004 | Fuchimukai .................. 348/371 |
| 2004/0169767 A1* | 9/2004 | Norita et al. .................. 348/350 |
| 2005/0025358 A1 | 2/2005 | Qi et al. |
| 2005/0099530 A1* | 5/2005 | Mizobuchi .................... 348/370 |
| 2005/0100213 A1 | 5/2005 | Qi et al. |
| 2005/0174473 A1 | 8/2005 | Morgan et al. |
| 2006/0055818 A1 | 3/2006 | Hwang |
| 2007/0162736 A1 | 7/2007 | Wu et al. |
| 2008/0001547 A1 | 1/2008 | Negru |
| 2009/0042606 A1 | 2/2009 | Embler |
| 2009/0136225 A1 | 5/2009 | Gai et al. |
| 2009/0278979 A1 | 11/2009 | Bayerl et al. |
| 2010/0118544 A1 | 5/2010 | Lao |
| 2010/0171145 A1 | 7/2010 | Morgan et al. |
| 2010/0182294 A1 | 7/2010 | Roshan et al. |
| 2010/0245623 A1* | 9/2010 | Kasahara et al. .......... 348/231.2 |
| 2010/0254692 A1 | 10/2010 | Kurt et al. |
| 2011/0103045 A1 | 5/2011 | Shay |
| 2011/0115411 A1 | 5/2011 | Shteynberg et al. |
| 2011/0216179 A1 | 9/2011 | Dialameh et al. |

* cited by examiner

TERMINAL HAVING PLURALITY OF OPERATING MODES

CROSS-REFERENCE TO RELATED APPLICATIONS

This application claims the benefit of U.S. patent application Ser. No. 12/684,724 for a Terminal Having Plurality of Operating Modes filed Jan. 8, 2010 (and published Jul. 14, 2011 as U.S. Patent Application Publication No. 2011/0169999), now U.S. Pat. No. 8,698,949. Each of the foregoing patent application, patent publication and patent is hereby incorporated by reference in its entirety.

FIELD OF THE INVENTION

The invention relates to registers for registering data in general and in particular to an optical based register operative for capture of image data in at least one operating mode.

BACKGROUND

Multifunctional terminals are growing in popularity. A known mobile telephone has a user interface a radio communication interface, and an image sensor array for use in acquisition of frames of image data. Portable data terminals for use in data collection applications also commonly include image sensor arrays. Portable data terminals are commonly used in a variety of applications such as point of sale applications, warehouse applications, medical application, and shipping applications. Both mobile telephone terminals and portable data terminals can be portable and hand held. Image sensor arrays of a terminal can be used for frame capture.

SUMMARY

There is set forth herein a terminal having an image sensor array and a plurality of operator selectable operating modes. The image sensor array can have an associated light source bank. The operator selectable operating modes can include at least one camera operating mode and at least one flashlight operating mode. In the at least one camera operating mode the image sensor array and light source bank can be controlled for optimization of frame capture. In the at least one flashlight operating mode the image sensor array and the light source bank can be controlled for optimizing illumination of an operators viewing area with reduced average power consumption.

BRIEF DESCRIPTIONS OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION

Figure 1:
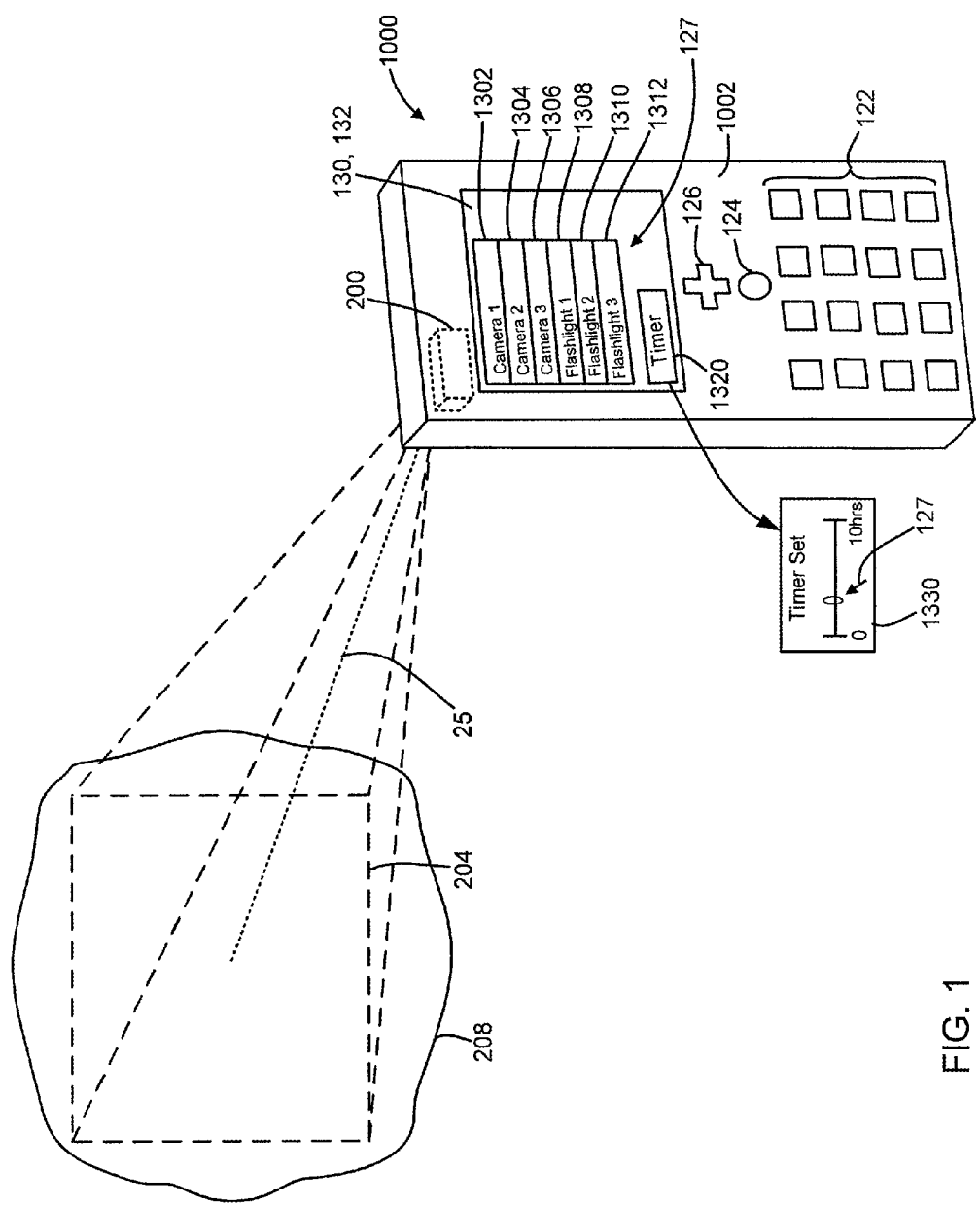
FIG. 1 is physical form view of a terminal having a camera operating mode and a flashlight operating mode.

Referring to FIG. 1, there is set forth herein a terminal 1000 having an imaging module 200 and a plurality of operator selectable operating modes. The imaging module 200 can have an associated image sensor array light source bank. The operator selectable operating modes can include at least one camera operating mode and at least one flashlight operating mode. In the at least one camera operating mode the image sensor array and light source bank can be controlled for optimization of frame capture. In the at least one flashlight operating mode the image sensor array and the light source bank can be controlled for optimizing illumination of an operator's viewing area with reduced power consumption.

Referring to further aspects of terminal 1000 a user interface of terminal 1000 can include display 130 and its associated touch panel 132 (forming a touch screen) and keyboard 122, trigger 124 and pointer mechanism 126 for allowing an operator to move a pointer 127. An operator in one embodiment can select a desired operating mode by selection of an appropriate button 1302, 1304, 1306, 1308, 1310, 1312 displayed by display 130. Terminal 1000 can include a hand held housing 1002 which incorporates an imaging module 200 and additional components as are set forth herein.

Figure 3:
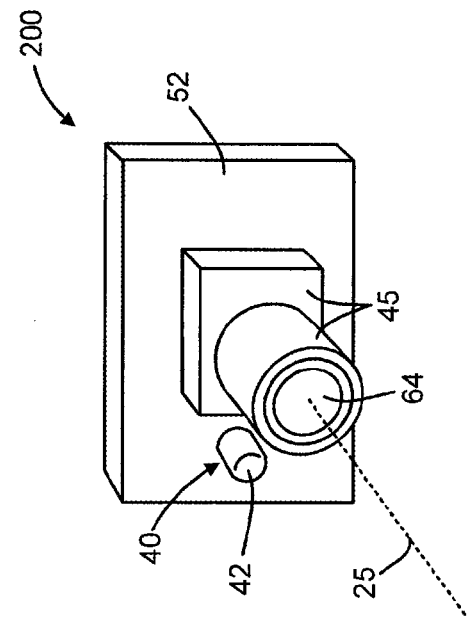
FIG. 3 is a perspective view of an assembled imaging module.
Figure 2:
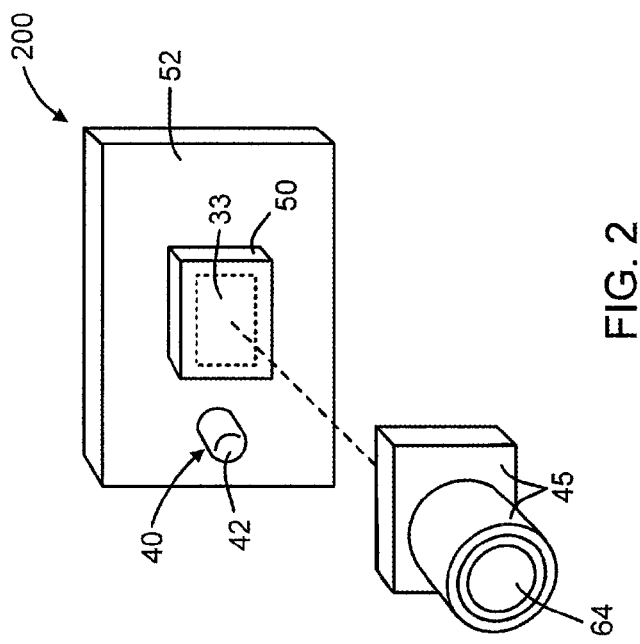
FIG. 2 is a perspective assembly view of an imaging module.

An image sensor array 33 and a light source bank 40 of terminal 1000 can be incorporated in an imaging module 200 an example of which is shown in FIGS. 2 and 3. In the example of FIGS. 2 and 3 imaging module 200 can include a printed circuit board 52 carrying an image sensor integrated circuit 50. Image sensor integrated circuit 50 can include an image sensor array 33. Imaging module 200 can further include a support 45 which supports an imaging lens assembly 64 at a position forward of the image sensor integrated circuit 50. Imaging module 200 can also comprise a light source bank 40 comprising one or more light sources. Imaging lens assembly 33, in combination with image sensor array 33 can define a field of view 204 of terminal 1000. Imaging lens assembly 64 can define an imaging axis 25. Terminal 1000 can be operative so that light source bank 40 when energized projects light about imaging axis 25 and further so that imaging axis 25 intersects a cone or light emitted by light source bank 40. Light source bank 40 can be energized for projection of light pattern 208 substantially corresponding to field of view 204. For projection of light pattern 208, terminal 1000 can be operated so that light source bank 40 projects light toward field of view 204. In the embodiment of FIG. 2 a light source bank 40 of imaging module 200 is provided by a single LED 42. LED 42 in one particular embodiment can be a white LED that is configured to emit white light. Shown as including a single circuit board for mounting of light source bank 40 and image sensor integrated circuit 50, imaging module 200 can also have spaced apart circuit boards for carrying light source bank 40 and image sensor integrated circuit 50, respectively.

Figure 4:
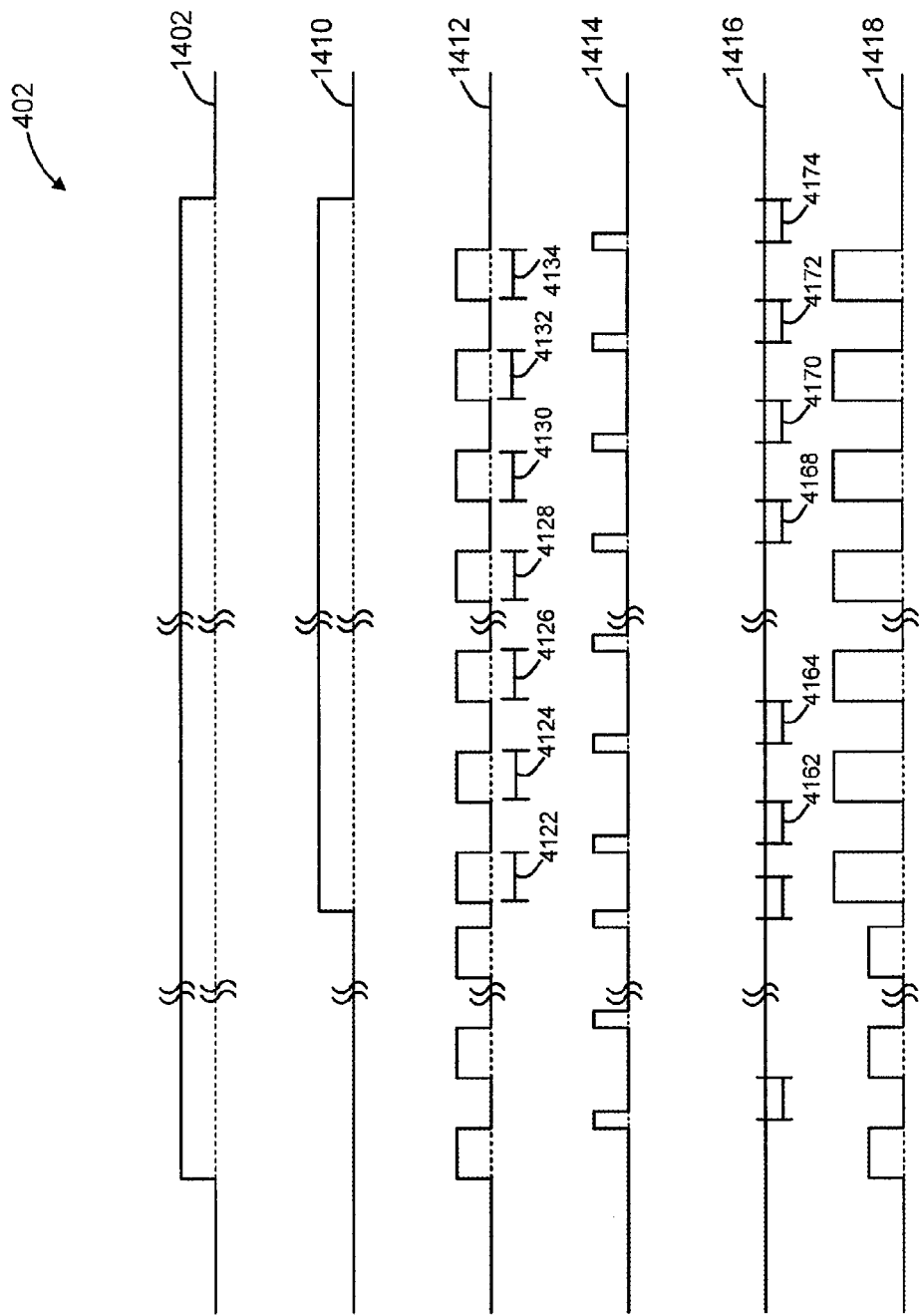
FIG. 4 is a timing diagram illustrating operation of a terminal in a camera operating mode in one embodiment.
Figure 5:
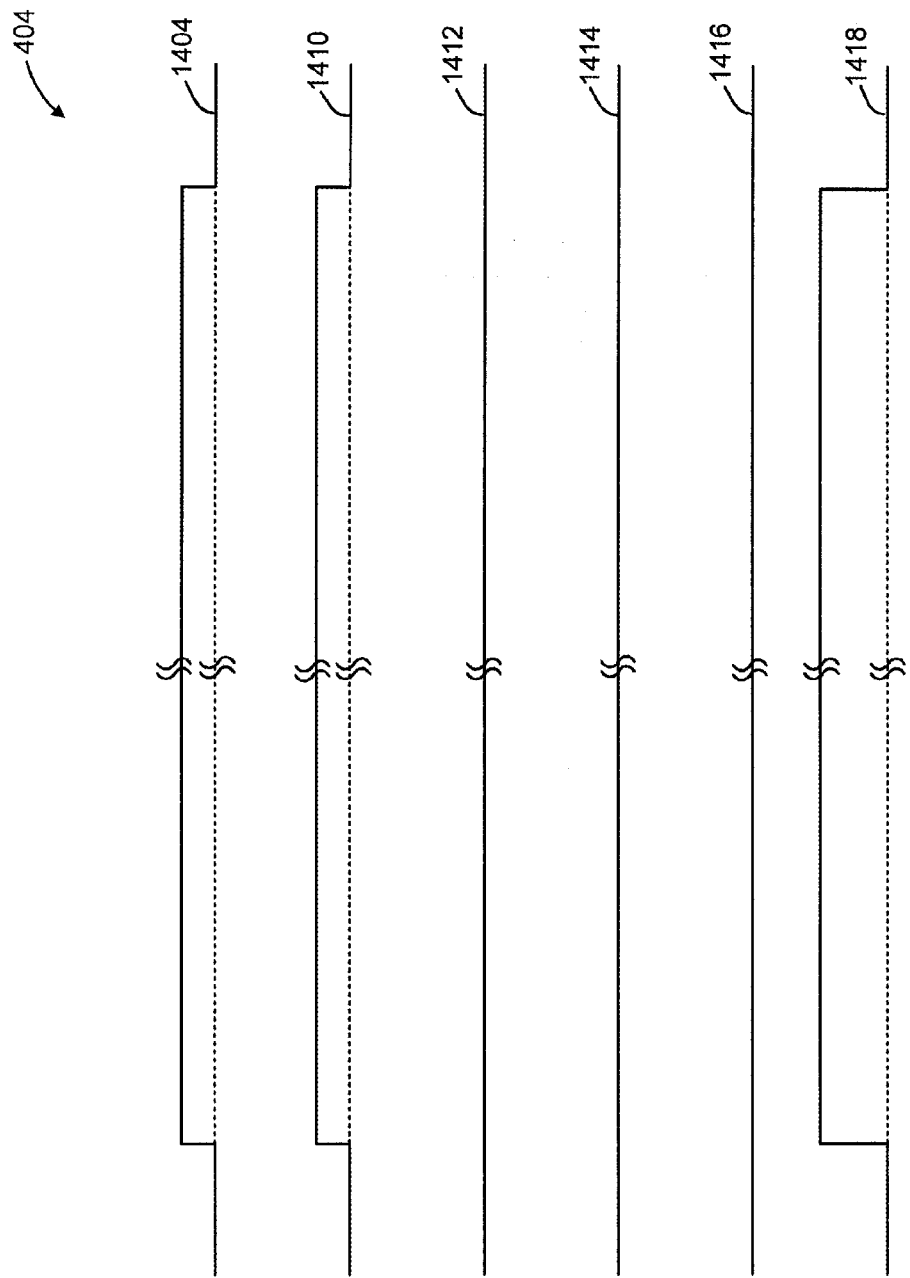
FIGS. 5-7 are timing diagrams illustrating operation of a terminal in a flashlight operating mode in various embodiments.

A plurality of operating modes of terminal 1000 is described with reference to the timing diagrams of FIGS. 4-7. Referring to FIG. 4 timing diagram 402 is a timing diagram illustrating operation of terminal when the operating mode Camera 1 is active.

The camera operating mode "Camera 1" can be made active by actuation of button 1302. Signal 1402 indicates the activation period of the operating mode. Signal 1410 is a trigger signal, where logic high periods of signal 1402 indicate active periods of a trigger signal 1410. Signal 1412 is an exposure control signal, wherein high periods of signal indicate exposure periods of image sensor array 33. Signal 1414 indicates readout periods of images sensor array 33. Signal 1410 is an energization level of light source bank 40. Timeline 1416 indicates processing periods of CPU 150 of terminal 1000 for processing various frames of image data. When the operating mode is activated terminal 1000 can be operative to activate image sensor array 33 for exposure and readout and processing of image data. Prior to a time that a trigger signal 1410 is activated, frames that are processed during operation in the Camera 1 operating mode are subject to processing for parameter determination, e.g., exposure and or gain setting determination. After activation of a trigger signal 1410 terminal 1000 can utilize a parameter or parameters determined prior to activation of the trigger signal for capture of a frame of image data which in one embodiment can comprise readout, conversion, and buffering of the frame of image data into a memory, e.g., memory 80 as will be described herein. During exposure periods 4122, 4124, 4126, 4128, 4130, 4132, 4134 of frames captured subsequent to activation of a trigger signal 1410, an energy level of light source bank 40 can be activated to a level greater than before the activation of trigger signal 1410. During the activation period of trigger signal 1410 a plurality of frames can be captured and subject to processing during processing periods 4162, 4164, 4166, 4168, 4170, 4172, 4174. The processing can include averaging a succession of frames for noise reduction. The processing of frames can also include scoring for selection of a best frame for output. The processing can also include processing for attempting to decode a decodable indicia representation such as a bar code representation. The processing can also include formatting of a frame into a compressed image file format, e.g., JPG, TIF.

Referring to timing diagram 404, timing diagram 404 illustrates operation of terminal 1000 when the operating mode Flashlight 1 is active. Signal 1404 indicates the activation period of the operating mode "Flashlight 1." Signal 1410 is a trigger signal with logic high periods of the trigger signal 1410 indicating logic high periods of the trigger signal active and inactive periods. In the specific example trigger signal 1410 is synchronized to the operating mode state signal 1404. Such synchronization can be provided by utilization of the operating mode state signal as a trigger signal. However a separate actuator can be provided for activation of trigger signal 1410. Signal 1412 is an exposure control signal, wherein high periods of signal indicate exposure periods of image sensor array 33. Signal 1414 indicates readout periods of image sensor array 33. Signal 1418 is a drive signal controlling an energization level of light source bank 40. Timeline 1416 indicates processing periods of CPU 150 of terminal 1000 for processing various frames of image sensor. Referring to signals 1412 and 1414, signals 1412 and 1416 can be maintained in a logic low state to restrict operation of image sensor array 33 in the Flashlight 1 operating mode, thus significantly reducing power consumption relative to a camera operating mode. Power consumption is also reduced for the reason that CPU 150 does not process image data in the mode depicted in the timing diagram of FIG. 5. Referring to light bank energization signal 1418 light source bank 40 can be energized to be ON during the activation period of the Flashlight Operating mode 1. While a steady state drive signal is depicted in timeline 1418 light source bank 40 can also be driven with a pulsed drive signal. The trigger signal activation period indicated by the logic high period of trigger signal 1410 can terminate on occurrence of a termination condition. A termination condition can be e.g. manual deactivation of the trigger signal by actuation of a specified actuator of terminal 1000. A termination condition can also be e.g. expiration of a timer referring to FIG. 1. Terminal 1000 can be configured to allow an operator to set a timer utilizing a user interface of terminal 1000. For example terminal 1000 can be configured so that actuation of button 1320 returns window 1330 allowing an operator to designate a time for controlling a timeout of a trigger signal. In the Flashlight 1 operating mode depicted in FIG. 5, terminal 1000 can restrict image sensor array 33 from operation (e.g., to expose frames for readout) for a duration of operating mode.

Figure 6:
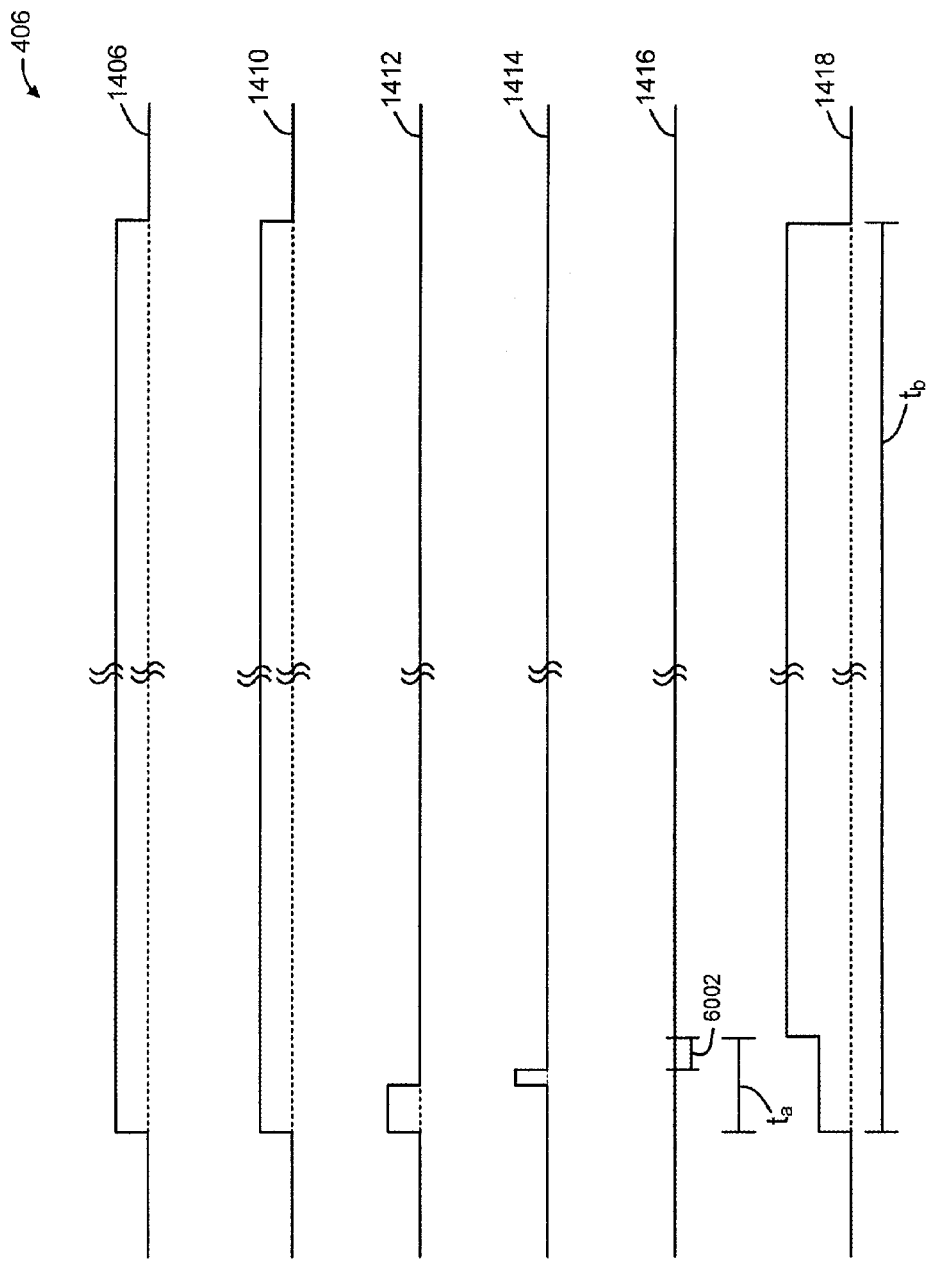

Referring to timing diagram 406 of FIG. 6 timing diagram 406 illustrates operation of terminal 1000 when the operating mode Flashlight 2 is active. Signal 1406 indicates the activation period of the operating mode. Signal 1410 indicates active and inactive periods of a trigger signal. Signal 1412 is an exposure control signal, wherein logic high periods of signal indicates exposure periods of image sensor array 33. Signal 1414 indicates readout periods of image sensor array 33. Signal 1418 is an energization level of light source bank 40. Timeline 1416 indicates processing periods of CPU 150 of terminal 1000 for processing various frames of image sensor. Referring to signals 1412, signals 1414, image sensor array 33 can be minimally controlled during an activation period of the Flashlight 2 operating mode for capture and processing of a parameter determination frame. The parameter determination frame can be processed for determination of parameter for determining an aspect of operation of terminal 1000 in the selected flashlight operating mode. In one example a parameter determination frame can be processed for determining of a white level (average pixel value a frame), a higher white value indicating a relatively higher level of ambient illumination. Responsive to the white level, terminal 1000 can control e.g., a time out period of the selected flashlight operating mode of operation, and an energization level of light source bank (a higher energization level may be selected where lower ambient light levels are detected. Referring to FIG. 6, after processing of the parameter determination frame during processing period 6002 terminal 1000 can maintain signals 1412, 1414 in a logic low state to restrict activation of image sensor array 33 while maintaining an energy level of light source bank 40 at energy level suitable for illumination of a viewing area of terminal 1000. Following determination of an operating parameter, terminal 1000 can restrict image sensor array 33 from operation for a remainder of the operating mode, i.e., for duration of time the terminal 1000 operates in the Flashlight 2 operating mode subsequent to the determination of the operating parameter determined during processing period 6002. Remaining aspects of the Flashlight 2 operating mode can be in accordance with the features described with reference to Flashlight 1 operating mode.

Figure 7:
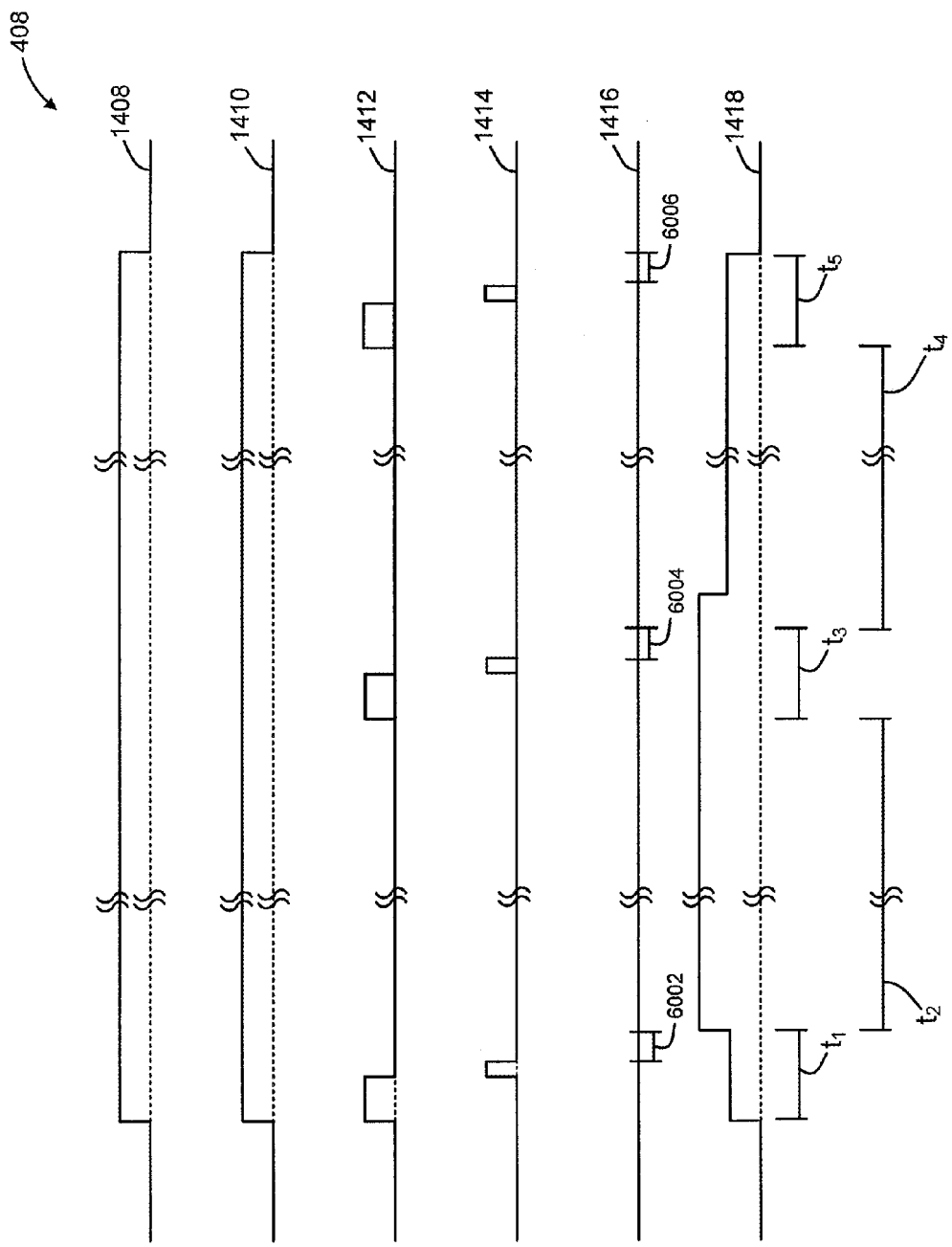

Regarding FIG. 7, timing diagram 408 illustrates operation of terminal 1000 in the operating mode Flashlight 3. Operation of terminal 1000 in the operating mode Flashlight 3 is as show in timing diagram 406 (Flashlight 2 operating mode) except that in the Flashlight 3 operating mode, terminal 1000 can periodically capture and process one or more parameter determination frames a time after capturing and processing a parameter determination frame. With reference to timing diagram terminal 1000 can have inactive periods e.g., $t_2$ and $t_1$ as shown intermediate of active periods, e.g., $t_1$, $t_3$, $t_5$ as shown. During the active periods, image sensor array 33 can be activated for exposure and readout, and CPU 150 can be active for processing of parameter denomination frames. For example, CPU 150 can process a frame of image data for determining a white level (average pixel value) of the frame and can responsively set, e.g., a timeout parameter of the mode, or an energization level for light source bank 40. In one embodiment terminal 1000 can determine that terminal 1000 should deactivate the present flashlight mode responsively to a processing of a parameter determination frame. For example, terminal 1000 can be operated to de-activate a flashlight mode if a white level of a frame indicates that there is ambient illumination above threshold issue (as indicated by the white value). In the example of FIG. 7, there is shown a deactivation of a flashlight mode responsively to frame processing during processing period 6006.

With reference to the timing diagram 408 of FIG. 7, the active periods, $t_1$, $t_2$, $t_5$ can be shorter in duration than inactive periods, $t_3$, $t_4$ in which image sensor array 33 is restricted from operation and in which CPU 150 is restricted from processing frames of image data. Referring to timing diagrams 402, 404, 406, 408, is seen that average power consumption (power consumed over unit of time) of terminal 1000 attributable to activation of image sensor array 33 and processing of frames of image data can be less in flashlight operating mode than in a camera operating mode. In one embodiment of a camera operating mode, image sensor array 33 can be essentially continuously active for exposure and readout of frames of image data for a duration of a time terminal 1000 operates in the camera operating mode. In one embodiment, the active periods $t_1$, $t_3$, $t_5$ can be shorter in duration than the inactive periods $t_2$, $t_4$. In one embodiment, the average period of the active periods is shorter than the average period of the inactive periods. In one embodiment, $t_1$, $t_3$, $t_5 < t_2$, $t_4$. In one embodiment, $t_1$, $t_3$, $t_5 \ll t_2$, $t_4$. In one embodiment, inactive periods $t_2$ and inactive period $t_4$ are each at least ten times the duration of each of active periods $t_1$, $t_3$, $t_5$, and in one embodiment at least one hundred times the duration. In one embodiment, each of active periods $t_1$, $t_3$, $t_5$ has a duration of less than 1 second, and each of inactive periods has a duration of greater than one minute, and in another embodiment greater than 5 min, and in another embodiment greater than 10 minutes. Referring to the timing diagrams of FIG. 6, terminal 1000 with Flashlight mode 2 active can have an active period $t_a$ of about one frame period, and an inactive period $t_b$ ($t_a \ll t_b$) following the active period $t_a$ in which operation of image sensor assembly 33 is restricted for a duration of the remaining time terminal 1000 operates in the depicted Flashlight 2 operating mode. In one example, the active period $t_a$ has a duration of less than one second, and the inactive period, $t_b$, has a duration of more than e.g., 1 min., 10 min., 30 min.

A suitable hardware platform for terminal 1000 is described with reference to FIG. 8.

Figure 8:
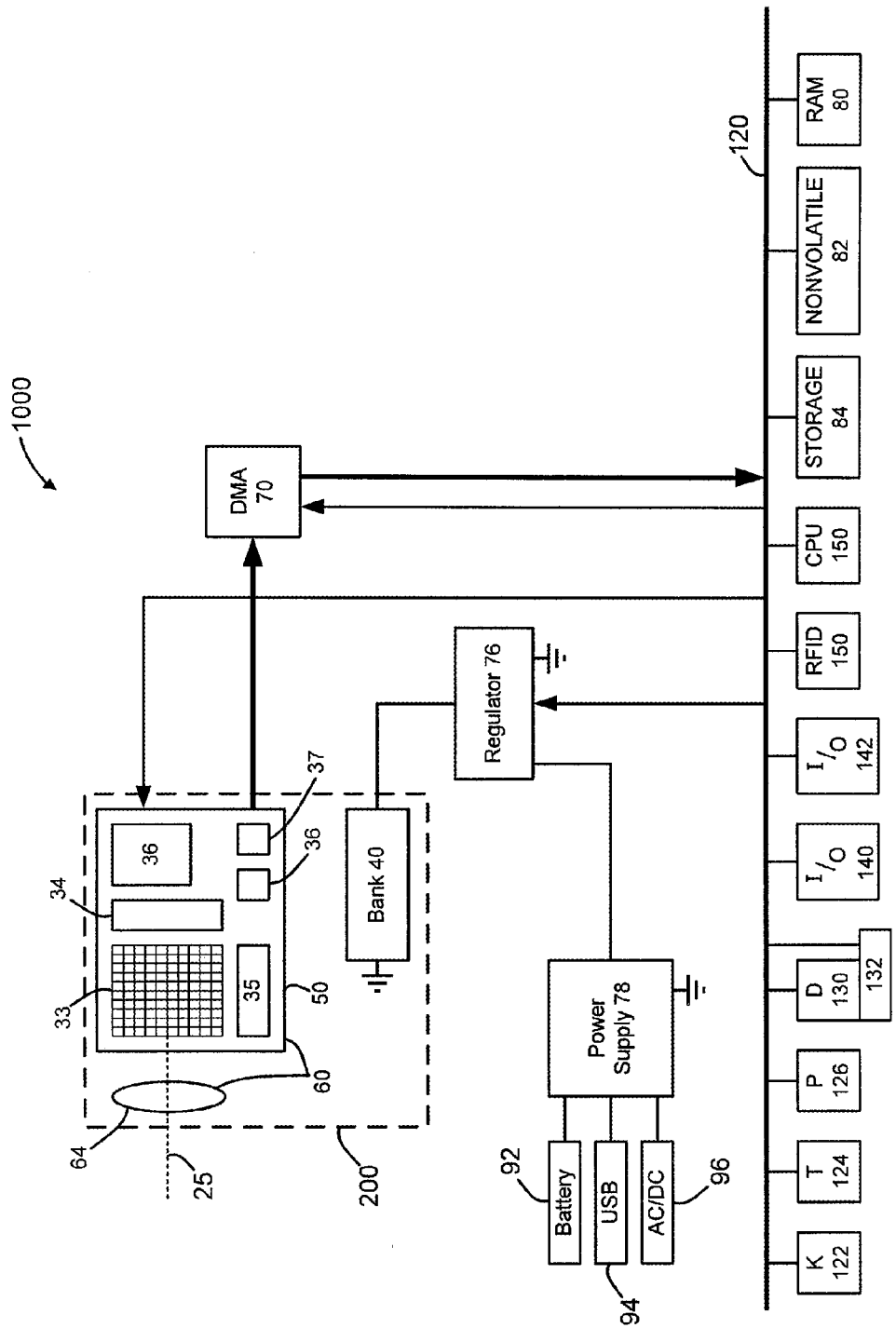
FIG. 8 is a block electrical diagram illustrating a hardware platform for a terminal having an image sensor array.

In FIG. 8 there is shown an exemplary electrical circuit diagram supporting operations of terminal 1000 incorporating an imaging module 200 as shown in FIGS. 2, 3, and 4. Terminal 1000 can include image sensor integrated circuit 50 which can be in communication with Direct Memory Access (DMA) unit 70. Terminal 1000 can also include a central processing unit (CPU) 150. Terminal 1000 can be operative so that in response to activation of a trigger signal 1410, terminal 1000 continuously reads out, converts and buffers frames of image data into a working memory such as memory 80 and subjects buffered frames of image data to decode attempts for a time that trigger signal 1410 remains active. The process of receiving frames of image data and subjecting the frames of image data to a decode attempt can continue until a decoded message is determined and output.

Regarding image sensor integrated circuit 50, image sensor integrated circuit 50 can be provided on an integrated circuit chip depicted in FIG. 2 having an image sensor array 33, column circuitry 34, row circuitry 35, a gain block 36, an analog-to-digital converter 37, and a timing and control block 38. Image sensor array 33 can be a two dimensional image sensor array having a plurality of light sensitive pixels formed in a plurality of rows and columns. Terminal 1000 can further include a CPU, imaging lens assembly 64, a direct memory access (DMA) unit 70, a volatile system memory 80 (e.g., a random access memory, RAM), a nonvolatile system memory 82 (e.g., EPROM), a storage memory 84, a wireline input/output interface 140 (e.g., Ethernet), and an RF transceiver interface 142 (e.g., IEEE 802.11). System memory 80 can be regarded as a working memory. Storage memory 84 can be provided by e.g., a hard drive, or a flash memory device, which flash memory device can also provide various functions of system non-volatile memory 82. Terminal 1000 can also include a keyboard 122, a trigger button 124, and a pointer mechanism 126 for input of data and for initiation of various controls and a display 130 for output of information to an operator. Terminal 1000 can also include a touch panel 132, and the components of touch panel 132 and display 130 can be regarded as a touch screen. A user interface at terminal 1000 can be provided by a combination of one or more of devices 122, 124, 126, 130, 132. Terminal 1000 can also include a system bus 120 providing communication between CPU 150 and various components of terminal 1000. DMA unit 70 can be provided by, e.g., a field programmable gate array (FPGA) or an application specific integrated circuit (ASIC). While shown as being separate units, DMA unit 70 and CPU 150 can be provided on a common integrated circuit.

In response to control signals transmitted by CPU 150, timing and control circuit 38 can send image sensor array timing signals to array 33 such as reset, exposure control, and readout timing signals. After an exposure period, a frame of image data can be read out of image sensor array 33. Analog image signals that are read out of array 33 can be amplified by gain block 36 converted into digital form by analog-to-digital converter 37 and sent to DMA unit 70. DMA unit 70, in turn, can transfer digitized image data for buffering into volatile memory 80. CPU 150 can address frames of image data buffered in volatile memory 80 for processing. A capture of a frame or image data can be reproduced as including the steps of readout, conversion and buffering. Such processing can include attempting to decode for decodable indicia represented in a frame of image data.

Further regarding the block diagram of FIG. 8, terminal 1000 can include regulator 76 for regulating the delivery of power to light source bank 40. For supplying power to the regulator 76 there can be a power supply 78, which can be interfaced to various alternative power sources, e.g., a battery 92, a USB cable 94, an AC/DC transformer 94.

It has been described that terminal 1000 can subject received frames to decoding processing. In subjecting a frame of image data to decoding processing, terminal 1000 can attempt to decode a decodable indicia, e.g., a bar code symbol or an OCR character. For example, in attempting to decode a 1D bar code symbol represented in a frame of image data, CPU 150 can execute the following processes: First, CPU 150 can launch a scan line in a frame of image data, e.g., at a center of a frame, or a coordinate location determined to include a decodable indicia representation. Next, CPU 150 can perform a second derivative edge detection to detect edges. After completing edge detection, CPU 150 can determine data indicating widths between edges. CPU 150 can then search for start/stop character element sequences and if found, derive element sequence characters character by character by comparing with a character set table. For certain symbologies, CPU 150 can also perform a checksum computation. If CPU 150 successfully determines all characters between a start/stop character sequence and successfully calculates a checksum (if applicable), CPU 150 can out a decoded message. When outputting a decoded message, CPU 150 can one or more of (a) initiate transfer of the decoded message to an external device, (b) initiate display of a decoded message on a display of terminal 1000, (c) attach a flag to a buffered decoded message determined by CPU 150, and (d) write the decoded message to an address on long term memory, e.g., 82 and/or 84. At the time of outputting a decoded message, CPU 150 can send a signal to an acoustic output device of terminal 1000 (not shown) to emit a beep.

Figure 9:
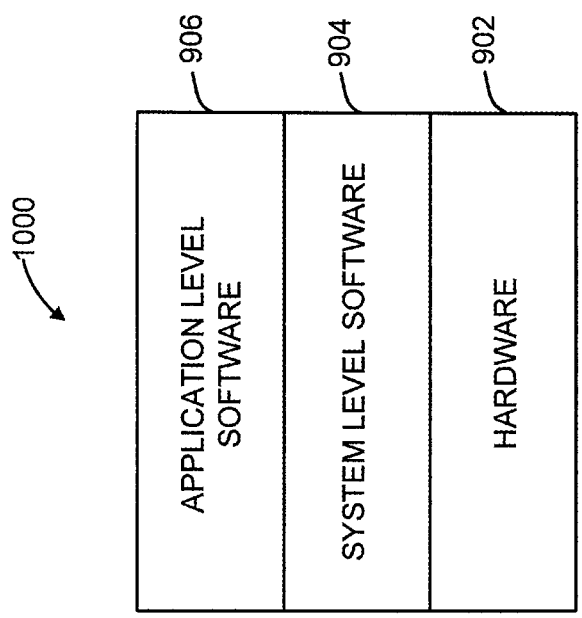
FIG. 9 is a system diagram for a terminal.

A system diagram of terminal 1000 is shown in FIG. 9. Terminal 1000 can include hardware 902, e.g., CPU 150 and various memory elements 80, 82, 84. Terminal 1000 can also include system level software 904, which can include a basic input/output system (BIOS) and an operating system (OS). Terminal 1000 can also include application level software 906, such as file directory stored software programs. On bootup of terminal 1000, program code of a BIOS can be executed by CPU 150 and an operating system can be loaded from a storage memory, e.g., memory 84 into memory 80 for execution. When program code of an OS has been loaded into memory 80, it is available for immediate execution by CPU 150. In some embodiments, a subset of program code making up an OS can remain stored in storage memory 84 after completion of bootup until it is requested, at which time it can be loaded into memory 80 for execution. Memory 80 as set forth herein can be a system volatile memory and can be a random access memory (RAM). At the completion of bootup, application software programs of terminal 1000 can remain in a file directory defined in storage memory 84 until, responsively to a command initiated by an operators, it is loaded from memory 84 to memory 80 for execution. Terminal 1000 can be operative so that after bootup is complete, software programs of application level software 906 can be accessed by an operator with use of a user interface of terminal 1000. The BIOS of terminal 1000 can provide basic input/output functions of terminal 1000, e.g., for initializing peripheral devices, such as devices 50, 80, 82, 84, 122, 124, 126, 130, 132, 140, 142, 76, 40. The BIOS of terminal 1000 can include program code for execution by CPU 150 that is stored on a system non-volatile memory 82 of terminal e.g., a read only memory (ROM). Terminal 1000 can be operative so that program code of the BIOS is either executed on bootup by CPU 150 or is available for immediate execution by CPU 150 on completion of bootup. The operating system (OS) of terminal 1000 can provide a number of functions including providing an interface to device drivers allowing peripheral devices of terminal such as devices 50, 80, 82, 84, 122, 124, 126, 130, 132, 140, 142, 76, 40, 3 to be controlled. The operating system of terminal can also schedule tasks, respond to interrupts, and provide file management services allowing access to files stored in a file directory of terminal. Terminal 1000 can be operative so that on power up of terminal 1000, terminal 1000 commences a bootup process (bootup). By way of a bootup process, program code of BIOS of terminal 1000 can be executed by CPU 150, and if not executed by CPU 1250 during bootup can be available for immediate execution by CPU 150, e.g., by way of it being stored in system non-volatile memory 82 which can be provided by a ROM. As part of the bootup, following execution of program code of the BIOS, an operating system of terminal 1000 can be loaded from storage memory 84 to memory 80 e.g., a RAM for execution by CPU 150. Software application programs of terminal 1000 can be controlled by the operating system. In one example, a command of a software program included as part of the application level software 906 can be executed by CPU 150 within a time slot that is established by a scheduler of a previously loaded operating system. An example of a suitable operating system for terminal 1000 is the WINDOWS CE operating system.

There is set forth herein a terminal comprising an image sensor array having a plurality of pixels arranged over a two dimensional area; an imaging lens for focusing an image onto the image sensor array wherein the imaging lens in combination with the image sensor array define a field of view of the terminal; a light source bank for use in projecting light in a direction of the field of view; a hand held housing incorporating the image sensor array; a CPU configured to execute system level software, the system level software including a basic input/output system (BIOS) and an operating system; wherein the terminal is configured to be operative in an operator selectable camera operating mode and an operator selectable flashlight operating mode; wherein the terminal in the camera operating mode executes a first software program, the terminal in accordance with the first software program subsequent to activation of a trigger signal energizing the light source bank and controlling the image sensor array so that the terminal has a first average power consumption attributable to activation of the image sensor array and processing of image data; wherein the terminal in the flashlight operating mode executes a second software program, the terminal in accordance with the second software program energizing the light source bank and controlling the image sensor array so that the terminal in the flashlight operating mode has a second average power consumption attributable to the activation of the image sensor array and processing of image data, the second average power consumption being less than the first average power consumption; wherein said first software program is executed as an application controlled by said operating system; and wherein said second software program is provided as a part of the system level software.

In one embodiment, the software architecture facilitating operation of the terminal in a camera operating mode can be differentiated from a software architecture facilitating operation of the terminal in a flashlight mode. In one embodiment, the camera operating mode is facilitated with use of an application level software program that is controlled by the operating system and a flashlight operating mode is facilitated with use of a software program that is incorporated as part of the system level software 904, e.g., as part of a terminal's BIOS or operating system. In one embodiment, a software program facilitating operation of terminal 1000 in a camera operating mode can be stored in a formatted executable file format in a file directory of terminal 1000 which file directory can be established in storage memory 84. Terminal 1000 can be operative so that an application level software program can remain stored in a file directory of storage memory 84 after bootup is complete, and after completion of bootup can be loaded into memory 80, e.g., RAM for execution (by CPU 150) responsively to an operator initiated command.

Facilitating a camera operating mode with use of an application level software program that is controlled by the operating system can be advantageous for a number of reasons. For example, such architecture allows updates of existing programs to be made without deactivation of terminal 1000. Such architecture also allows new software program applications (e.g., a Camera 2 operating mode, Camera 3 operating mode) to be downloaded into terminal 1000 without deactivation of terminal 1000. It may be desirable to provide a new camera mode, e.g., if terminal 1000 is to be used in a new environment (an environment having a specific lighting condition, or an environment having specific types of recognizable objects). Further, facilitating a camera mode with the use of an application level software program simplifies development of the software program. For example, commands for contemporaneous control of plurality of different processes, e.g., frame capture and image data processing (including processing for formatting into a compressed format) can be defined with use of application level program code and the scheduling of required tasks of the variety of processes can be handled by the operating system.

Facilitating a flashlight operating mode with use of a software program incorporated as part of the system software 904 can be advantageous for a number of reasons. For example, a time lag associated with activating the mode can be substantially reduced. A flashlight mode can be facilitated with use of a software program of system level software 904. In one embodiment, a software program facilitating a flashlight mode can be provided as part of a BIOS, and in one embodiment can be stored on a system non-volatile memory 82, e.g., a ROM, where it is available for immediate execution by CPU 150 without a time delay resulting from an operator using a user interface of terminal 1000 for identifying a certain software program identifier in a file directory and without a time delay resulting from loading of program code for execution into memory 80. In one embodiment, a software program facilitating a flashlight mode can be provided as part of an operating system. In either case (whether the software program includes code for execution by CPU 150 that is part of the BIOS or code for execution by CPU 150 that is part of the OS), the software program, after completion of bootup, is available for immediate execution by CPU 150 responsively to a command initiated by an operator, without a delay involving identifying a software program within a file directory and without a software loading delay resulting from a loading of program code into memory 80. Where a flashlight mode is facilitated with use of a BIOS software program, a program code of the software program, by way of it being stored in memory 82, e.g., ROM, can be available for immediate execution by CPU 150 before an operating system has loaded.

System level software programs provided by third parties are available in forms that allow them to be customized by integrators. For example, WINDOWS CE by Microsoft is available with tools that allow customization so the system level software can be used with a specific hardware platform, e.g., a specific keyboard 122 and display 130. In one embodiment, a software program of terminal 1000 that facilitates operation in a flashlight mode includes a system level software program that provides for activation of a flashlight mode (in one embodiment, activation of the mode and simultaneous activation of trigger signal 1410) on activation of a specific "key sequence" e.g., a specific set of at least one button of keyboard 122, (e.g., CTRL+"X"). A software program of terminal 1000 that facilitates operation in a flashlight mode can also include a system level software program including system level program code that provides for deactivation of a flashlight mode (in one embodiment, deactivation of the mode and simultaneous deactivation of the trigger signal 1410) on actuation of a specific set of at least one button of keyboard 122 (e.g., CTRL+"Y"). Terminal 1000 can also be operative so that a flashlight mode is deactivated on expiration of a timeout. By providing a flashlight mode with use of a system level software program (e.g., as part of the BIOS or OS) available for execution by CPU 150 before or on completion of bootup, an operator does not have to access any file from a file directory for loading into memory 80 for activation of the mode. The mode can be made always immediately available without access or loading delay by activation of certain at least one actuator. The immediate availability of the mode can be particularly advantageous in view of the fact that a flashlight mode can be commonly accessed in emergency situations.

A small sample of the methods of an apparatus described herein are as follows:

A1. A terminal comprising:
an image sensor array having a plurality of pixels arranged over a two dimensional area;
an imaging lens for use in focusing an image onto the image sensor array wherein the imaging lens in combination with the image sensor array define a field of view of the terminal;
a light source bank for use in projecting light in a direction of the field of view;
a hand held housing incorporating the image sensor array;
wherein the terminal is configured to be operative in an operator selectable camera operating mode and an operator selectable flashlight operating mode;
wherein the terminal is operative so that when a trigger signal is activated when operating in the camera operating mode, the terminal captures and processes a plurality of frames of image data, and energizes the light source bank during exposure periods for the plurality of frames; and
wherein the terminal is further operative so that when a trigger signal is activated when operating in the flashlight operating mode, the terminal energizes the light source bank and restricts operation of the image sensor array for a duration of the flashlight operating mode.

A2. The terminal of A1, wherein the light source bank comprises a white light emitting LED.

A3. The terminal of A1, wherein the light source bank comprises a single white light emitting LED.

A4. The terminal of A1, wherein the terminal when processing the plurality of frames of image data in the camera operating mode attempts to decode a bar code symbol utilizing at least one of the plurality of frames.

A5. The terminal of A1, wherein the terminal in the camera operating mode selectively energizes the light source bank so that the light source bank is de-energized intermediate of the plurality of exposure periods.

A6. The terminal of A1, wherein the terminal includes a random access memory and wherein for operation in the camera operating mode, the terminal executes a first software program, and wherein for operation in the flashlight operating mode, the terminal executes a second software program, wherein the first software program is provided by an application level software program not loaded into the random access memory during bootup of the terminal, and wherein the second software program is provided by system level software program that is available for immediate execution before or on completion of a bootup of the terminal.

B1. A terminal comprising:
an image sensor array having a plurality of pixels arranged over a two dimensional area;
an imaging lens for use in focusing an image onto the image sensor array wherein the imaging lens in combination with the image sensor array define a field of view of the terminal;
a light source bank for use in projecting light in a direction of the field of view;
a hand held housing incorporating the image sensor array;

wherein the terminal is configured to be operative in an operator selectable camera operating mode and an operator selectable flashlight operating mode;

wherein the terminal is operative so that when a trigger signal is activated when operating in the camera operating mode, the terminal captures and processes a plurality of frames of image data, and energizes the light source bank during exposure periods for the plurality of frames, the terminal in the camera operating mode having a first average power consumption attributable to activity of the image sensor array and image data processing; and wherein the terminal in the flashlight operating mode responsively to activation of a trigger signal and during an active period captures a parameter determination frame and processes the parameter determination frame to determine an operating parameter determining an aspect of operation of the terminal in the flashlight operating mode, the terminal in the flashlight operating mode having a second average power consumption attributable to activity of the image sensor array and image data processing, the second average power consumption being lower than the first average power consumption, the terminal in the flashlight operating mode restricting operation of the image sensor array during an inactive period subsequent to the active period, the inactive period being longer than the active period.

B2. The terminal of B1, wherein the terminal in the flashlight operating mode subsequent to determination of the operating parameter restricts operation of the image sensor array for a duration of the operation of the terminal in the flashlight operating mode subsequent to the determination of the operating parameter.

B3. The terminal of B1, wherein the terminal in the flashlight operating mode has a second active period following the inactive period in which the terminal captures a second parameter determination frame, and processes the second parameter determination frame, the terminal in the flashlight operating mode having a second inactive period following the second active period, wherein a shortest of the first and second inactive periods is longer than a longest of the first and second active periods.

B4. The terminal of B3, wherein the shortest of the first and second inactive periods are at least 10 times the duration of the longest of the active periods.

B5. The terminal of B1, wherein the operating parameter is a light source bank energization level.

B6. The terminal of B1, wherein the terminal includes a random access memory and wherein for operation in the camera operating mode, the terminal executes a first software program, and wherein for operation in the flashlight operating mode, the terminal executes a second software program, wherein the first software program is provided by an application level software program not loaded into the random access memory during bootup of the terminal, and wherein the second software program is provided by system level software program that is available for immediate execution before or on completion of a bootup of the terminal.

C1. A terminal comprising:
an image sensor array having a plurality of pixels arranged over a two dimensional area;
an imaging lens for focusing an image onto the image sensor array wherein the imaging lens in combination with the image sensor array define a field of view of the terminal;
a light source bank for use in projecting light in a direction of the field of view;
a hand held housing incorporating the image sensor array;

a CPU configured to execute system level software, the system level software including a basic input/output system (BIOS) and an operating system;

wherein the terminal is configured to be operative in an operator selectable camera operating mode and an operator selectable flashlight operating mode;

wherein the terminal in the camera operating mode executes a first software program, the terminal in accordance with the first software program subsequent to activation of a trigger signal energizing the light source bank and controlling the image sensor array so that the terminal has a first average power consumption attributable to activation of the image sensor array and processing of image data;

wherein the terminal in the flashlight operating mode executes a second software program, the terminal in accordance with the second software program energizing the light source bank and controlling the image sensor array so that the terminal in the flashlight operating mode has a second average power consumption attributable to the activation of the image sensor array and processing of image data, the second average power consumption being less than the first average power consumption;

wherein said first software program is executed as an application controlled by the operating system; and wherein said second software program is provided as a part of the system level software.

C2. The terminal of C1, wherein the terminal includes a random access memory and, wherein the terminal is operative so the first software program is stored in a file directory of said terminal and loaded into the random access memory a time after bootup of the terminal responsively to an operator initiated command.

C3. The terminal of C1, wherein the terminal includes a random access memory, and wherein the second software program is loaded into the random access memory during bootup.

C4. The terminal of C1, wherein the terminal includes a random access memory, and wherein the terminal is operative so that the second software program can be executed without loading of the operating system into the random access memory.

C5. The terminal of C1, wherein the terminal is operative so that the image sensor array is restricted from operation for a duration of operation of the terminal in the flashlight operating mode.

C6. The terminal of C1, wherein the terminal includes a system non-volatile memory provided by a read only memory, and wherein the second software program is stored in the read only memory for immediate execution by the CPU without a software loading delay.

C7. The terminal of C1, wherein the terminal includes a storage memory, a system non-volatile memory provided by a ROM, and a system volatile memory provided by a RAM, wherein the first software program is stored on the storage memory and loaded into the random access memory for execution by the CPU a time after completion of bootup of the terminal responsively to an operation initiated command, and wherein the second software program is stored on the non-volatile memory for immediate execution by the CPU.

The invention claimed is:
1. A terminal comprising:
an image sensor array having a plurality of pixels arranged over a two dimensional area;

an imaging lens for use in focusing an image onto the image sensor array wherein the imaging lens in combination with the image sensor array define a field of view of the terminal;
a light source bank for use in projecting light in a direction of the field of view;
a hand held housing incorporating the image sensor array;
wherein the terminal is configured to be operative in an operator selectable camera operating mode and an operator selectable flashlight operating mode;
wherein the terminal is operative so that when a trigger signal is activated when operating in the camera operating mode, the terminal captures and processes a plurality of frames of image data, and energizes the light source bank during exposure periods for the plurality of frames, the terminal in the camera operating mode having a first average power consumption attributable to activity of the image sensor array and image data processing; and
wherein the terminal in the flashlight operating mode responsively to activation of a trigger signal and during an active period captures a parameter determination frame and processes the parameter determination frame to determine an operating parameter determining an aspect of operation of the terminal in the flashlight operating mode, the terminal in the flashlight operating mode having a second average power consumption attributable to activity of the image sensor array and image data processing, the second average power consumption being lower than the first average power consumption, the terminal in the flashlight operating mode restricting operation of the image sensor array during an inactive period subsequent to the active period, the inactive period being longer than the active period.

2. The terminal of claim 1, wherein the terminal in the flashlight operating mode subsequent to determination of the operating parameter restricts operation of the image sensor array for a duration of the operation of the terminal in the flashlight operating mode subsequent to the determination of the operating parameter.

3. The terminal of claim 1, wherein the terminal in the flashlight operating mode has a second active period following the inactive period in which the terminal captures a second parameter determination frame, and processes the second parameter determination frame, the terminal in the flashlight operating mode having a second inactive period following the second active period, wherein a shortest of the first and second inactive periods is longer than a longest of the first and second active periods.

4. The terminal of claim 3, wherein the shortest of the first and second inactive periods are at least 10 times the duration of the longest of the active periods.

5. The terminal of claim 1, wherein the operating parameter is a light source bank energization level.

6. The terminal of claim 1, wherein the terminal includes a random access memory and wherein for operation in the camera operating mode, the terminal executes a first software program, and wherein for operation in the flashlight operating mode, the terminal executes a second software program, wherein the first software program is provided by an application level software program not loaded into the random access memory during bootup of the terminal, and wherein the second software program is provided by system level software program that is available for immediate execution before or on completion of a bootup of the terminal.

7. A terminal comprising:
an image sensor having a field of view;
an imaging lens for focusing an image onto the image sensor; and
a light source for projecting light in a direction of the field of view;
wherein the terminal is configured for:
when operating in a camera mode and in response to a trigger signal, capturing frames of image data with the image sensor and energizing the light source during image sensor exposure periods for the captured frames of image data; and
when operating in a flashlight mode and in response to a trigger signal:
projecting light with the light source during a first image-sensor active period, a first image-sensor inactive period after the first image-sensor active period, a second image-sensor active period after the first image-sensor inactive period, and a second image-sensor inactive period after the second image-sensor active period;
capturing a first parameter determination frame with the image sensor during the first image-sensor active period;
processing the first parameter determination frame to determine a first operating parameter for the flashlight mode;
capturing a second parameter determination frame with the image sensor during the second image-sensor active period; and
processing the second parameter determination frame to determine a second operating parameter for the flashlight mode;
wherein, when in the camera mode, the terminal has a first average power consumption attributable to activity of the image sensor array and image data processing;
wherein, when in the flashlight mode, the terminal has a second average power consumption attributable to activity of the image sensor array and image data processing;
wherein the second average power consumption is lower than the first average power consumption;
wherein the first image-sensor inactive period is longer than the first image-sensor active period; and
wherein the first operating parameter is a light source energization level.

8. The terminal of claim 7, wherein the terminal is configured for, when operating in the flashlight mode, determining the second operating parameter for the flashlight mode and, thereafter, restricting operation of the sensor array.

9. The terminal of claim 7, wherein the second operating parameter is a light source energization level.

10. The terminal of claim 7, wherein the shorter of the first image-sensor inactive period and the second image-sensor inactive period is longer than the longer of the first image-sensor active period and the second image-sensor active period.

11. The terminal of claim 7, wherein the shorter of the first image-sensor inactive period and the second image-sensor inactive period is at least 10 times the duration of the longer of the first image-sensor active period and the second image-sensor active period.

12. The terminal of claim 7, wherein the terminal is configured for, when processing the second parameter determination frame to determine a second operating parameter for the flashlight mode, determining the second operating parameter such that the second operating parameter has a different value from the first operating parameter.

13. The terminal of claim 7, comprising a random access memory, wherein the terminal is configured for:

when in the camera mode, executing a first software program provided by an application level software program not loaded into the random access memory during bootup of the terminal; and when in the flashlight mode, executing a second software program provided by a system level software program that is available for immediate execution before or on completion of a bootup of the terminal.

14. A terminal comprising:

an image sensor having a field of view;

an imaging lens for focusing an image onto the image sensor; and a light source for projecting light in a direction of the field of view;

wherein the terminal is configured for:

when operating in a camera mode and in response to a trigger signal, capturing frames of image data with the image sensor and energizing the light source during image sensor exposure periods for the captured frames of image data; and when operating in a flashlight mode and in response to a trigger signal, projecting light with the light source during an image-sensor active period and an image-sensor inactive period, capturing a parameter determination frame with the image sensor during the image-sensor active period, and processing the parameter determination frame to determine an operating parameter for the flashlight mode, the image-sensor inactive period being longer than the image-sensor active period;

wherein, when in the camera mode, the terminal has a first average power consumption attributable to activity of the image sensor array and image data processing;

wherein, when in the flashlight mode, the terminal has a second average power consumption attributable to activity of the image sensor array and image data processing; and wherein the second average power consumption is lower than the first average power consumption.

15. The terminal of claim 14, wherein the terminal is configured for, when operating in the flashlight mode, determining the operating parameter for the flashlight mode and, thereafter, restricting operation of the sensor array.

16. The terminal of claim 14, wherein the terminal is configured for, when operating in the flashlight mode, projecting light with the light source during a second image-sensor active period after the image-sensor inactive period and a second image-sensor inactive period after the second image-sensor active period, capturing a second parameter determination frame with the image sensor during the second image-sensor active period, and processing the second parameter determination frame to determine a second operating parameter for the flashlight mode.

17. The terminal of claim 16, wherein the shorter of the image-sensor inactive period and the second image-sensor inactive period is longer than the longer of the image-sensor active period and the second image-sensor active period.

18. The terminal of claim 16, wherein the shorter of the image-sensor inactive period and the second image-sensor inactive period is at least 10 times the duration of the longer of the image-sensor active period and the second image-sensor active period.

19. The terminal of claim 14, wherein the operating parameter is a light source energization level.

20. The terminal of claim 14, comprising a random access memory, wherein the terminal is configured for:

when in the camera mode, executing a first software program provided by an application level software program not loaded into the random access memory during bootup of the terminal; and when in the flashlight mode, executing a second software program provided by a system level software program that is available for immediate execution before or on completion of a bootup of the terminal.

\* \* \* \* \*